US009692539B2

(12) United States Patent
Luo et al.

(10) Patent No.: US 9,692,539 B2
(45) Date of Patent: Jun. 27, 2017

(54) INCREMENTAL INTERFERENCE CANCELATION CAPABILITY AND SIGNALING

(71) Applicant: QUALCOMM Incorporated, San Diego, CA (US)

(72) Inventors: Tao Luo, San Diego, CA (US); Taesang Yoo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 13/659,633

(22) Filed: Oct. 24, 2012

(65) Prior Publication Data
US 2013/0114447 A1 May 9, 2013

Related U.S. Application Data

(60) Provisional application No. 61/556,020, filed on Nov. 4, 2011.

(51) Int. Cl.
*H04L 1/00* (2006.01)
*H04J 11/00* (2006.01)
*H04B 1/7103* (2011.01)

(52) U.S. Cl.
CPC ........ *H04J 11/0023* (2013.01); *H04B 1/7103* (2013.01); *H04B 2201/7071* (2013.01)

(58) Field of Classification Search
CPC ........... H04W 72/082; H04W 72/0406; H04W 72/1231; H04W 72/02; H04W 72/085
(Continued)

(56) References Cited

U.S. PATENT DOCUMENTS 7,826,575 B2 11/2010 Yang et al.
8,515,440 B2 8/2013 Damnjanovic et al.
(Continued)

FOREIGN PATENT DOCUMENTS

WO WO-2011005537 A2 1/2011
WO WO-2011103476 A1 8/2011

OTHER PUBLICATIONS

International Search Report and Written Opinion—PCT/US2012/062979—ISA/EPO—Mar. 6, 2013.

*Primary Examiner* — Ricky Ngo
*Assistant Examiner* — Wei-Po Kao
(74) *Attorney, Agent, or Firm* — Nerrie M. Zohn

(57) ABSTRACT

Incremental interference cancelation (IC) capability management and signaling is disclosed. A mobile device selects certain groups of its individual IC capabilities to deactivate in response to various operating conditions it is experiencing. The mobile device reports its currently active IC capability to a serving base station, which uses information to determine whether to modify any existing communication conditions with respect to the reporting mobile device. The base station detects and analyzes the current communication conditions with respect to the reporting mobile device in light of the mobile device's currently active IC capabilities. The base station may modify such conditions through actions such as signaling the mobile device to activate or deactivate certain other groups of IC capabilities. The base station can make other modifications such as changing the communication schedule for the mobile device, modifying the control loop for channel quality indicator (CQI) reporting, and the like.

36 Claims, 8 Drawing Sheets

(58) Field of Classification Search
USPC ................. 370/241, 242, 252, 253, 310–350
See application file for complete search history.

(56) References Cited

U.S. PATENT DOCUMENTS

| | | | |
|---|---|---|---|
| 2006/0063505 A1* | 3/2006 | Cairns | H04B 1/7097 |
| | | | 455/302 |
| 2007/0275722 A1* | 11/2007 | Thorson et al. | 455/436 |
| 2008/0248773 A1* | 10/2008 | De Carvalho | H04B 7/0854 |
| | | | 455/278.1 |
| 2008/0310485 A1 | 12/2008 | Soliman et al. | |
| 2009/0088172 A1 | 4/2009 | Lusky et al. | |
| 2009/0247148 A1* | 10/2009 | Chen et al. | 455/422.1 |
| 2010/0016012 A1 | 1/2010 | Valadon | |
| 2010/0099450 A1* | 4/2010 | Lu et al. | 455/501 |
| 2010/0322227 A1 | 12/2010 | Luo | |
| 2011/0206170 A1 | 8/2011 | Wilborn et al. | |
| 2012/0177068 A1 | 7/2012 | Lusky et al. | |
| 2012/0282864 A1* | 11/2012 | Dimou | H04W 36/22 |
| | | | 455/67.14 |
| 2014/0242995 A1* | 8/2014 | Lee | H04W 36/30 |
| | | | 455/436 |

\* cited by examiner

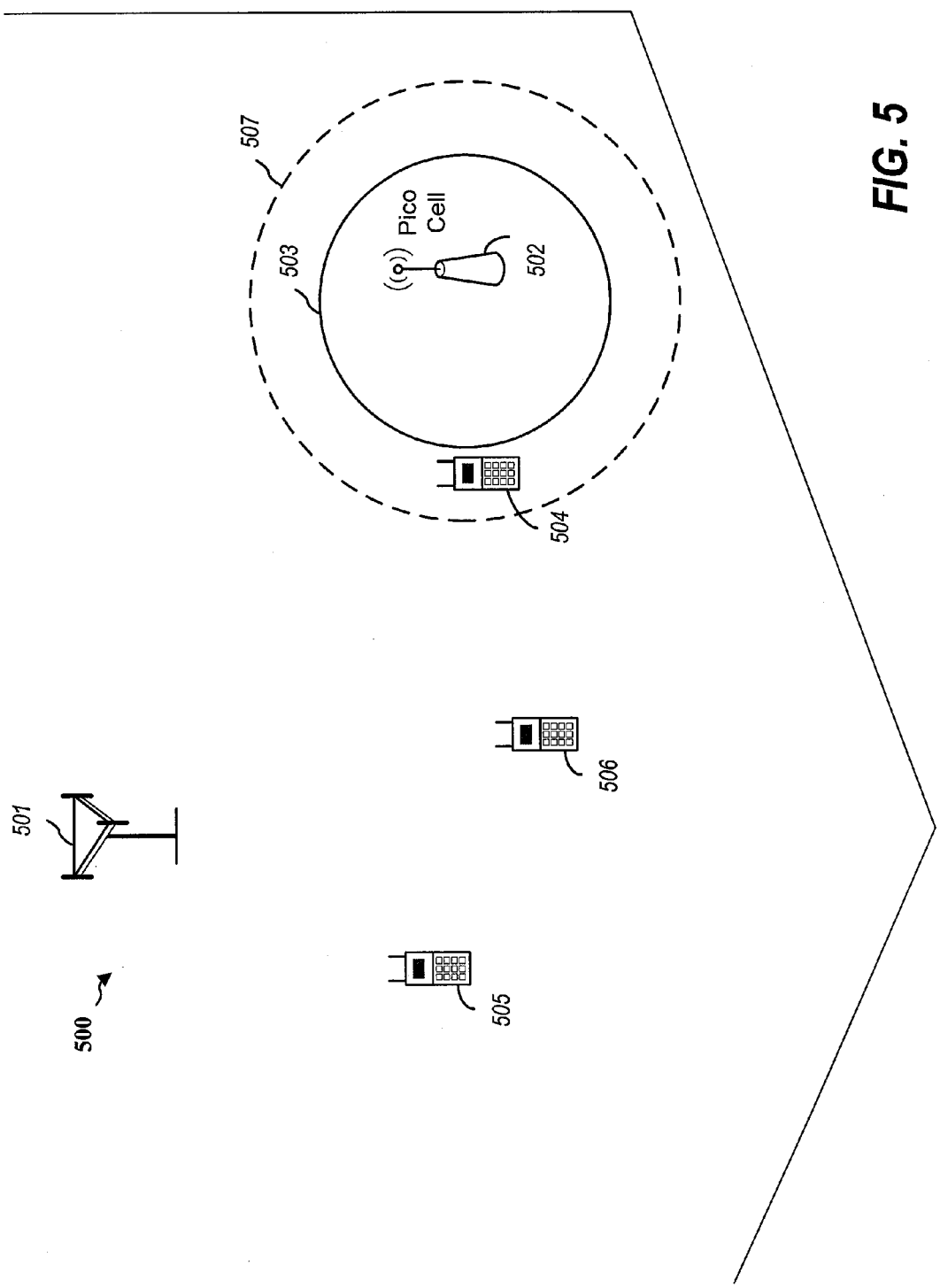

INCREMENTAL INTERFERENCE CANCELATION CAPABILITY AND SIGNALING

RELATED APPLICATIONS

The present application for Patent claims priority to Provisional Application No. 61/556,020, entitled "INCREMENTAL INTERFERENCE CANCELATION CAPABILITY AND SIGNALING" filed Nov. 4, 2011, and assigned to the assignee hereof and hereby expressly incorporated by reference herein for all purposes.

BACKGROUND

Field

Aspects of the present disclosure relate generally to wireless communication systems, and more particularly, to incremental interference cancelation (IC) capability and signaling.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to incremental IC capability management and signaling. In response to certain detected operating conditions at the UE, the UE will select certain of its individual IC capabilities to deactivate in order to improve such operating conditions. The UE will report its currently active IC capability to a serving eNB. The report may contain individual active IC capabilities or, if the UE groups its individual IC capabilities into broader groups, the report will contain reference to the groups that remain active. Using this current IC capability information, the eNB may determine whether to modify any existing communication conditions with respect to the reporting UE by detecting and analyze the current communication conditions with respect to the reporting UE's currently active IC capabilities. The eNB modifies such conditions through actions such as signaling the UE to activate or deactivate certain IC capabilities. The eNB can make other modifications such as changing the communication schedule for the UE, modifying the control loop for CQI reporting, and the like.

In one aspect of the disclosure, a method of wireless communication includes determining operating conditions of a mobile device, grouping one or more of a number of interference cancelation capabilities of the mobile device into several groups of interference cancelation capabilities, deactivating one or more groups of interference cancelation capabilities, and reporting a current interference cancelation capability to a base station, wherein the current interference cancelation capability comprises one or more active groups of the groups of interference cancelation capabilities remaining active after the deactivating.

In one aspect of the disclosure, a method of wireless communication, includes receiving, at a base station, a current interference cancelation capability report from a mobile device served by the base station, determining communication conditions of the mobile device in relation to the base station, and modifying the communication conditions based, at least in part, on the current interference cancelation capability report.

In an additional aspect of the disclosure, an apparatus configured for wireless communication, includes means for determining operating conditions of a mobile device, means for grouping one or more of a number of interference cancelation capabilities of the mobile device into several groups of interference cancelation capabilities, means for deactivating one or more groups of the groups of interference cancelation capabilities, and means for reporting a current interference cancelation capability to a base station, wherein the current interference cancelation capability comprises one or more active groups of groups of interference cancelation capabilities remaining active after execution of the means for deactivating.

In an additional aspect of the disclosure, an apparatus of wireless communication includes means for receiving, at a base station, a current interference cancelation capability report from a mobile device served by the base station, means for determining communication conditions of the mobile device in relation to the base station, and means for modifying the communication conditions based, at least in part, on the current interference cancelation capability report.

In an additional aspect of the disclosure, a computer program product has a computer-readable medium having program code recorded thereon. This program code includes code to determine operating conditions of a mobile device, code to group one or more of a number of interference cancelation capabilities of the mobile device into several groups of interference cancelation capabilities, code to deactivate one or more groups of the groups of interference cancelation capabilities, and code to report a current interference cancelation capability to a base station, wherein the current interference cancelation capability comprises one or more active groups of the groups of interference cancelation capabilities remaining active after execution of the program code to deactivate.

In an additional aspect of the disclosure, a computer program product has a computer-readable medium having program code recorded thereon. This program code includes code to receive, at a base station, a current interference cancelation capability report from a mobile device served by the base station, code to determine communication conditions of the mobile device in relation to the base station, and code to modify the communication conditions based, at least in part, on the current interference cancelation capability report.

In an additional aspect of the disclosure, an apparatus includes at least one processor and a memory coupled to the processor. The processor is configured to determine operating conditions of a mobile device, to group one or more of a number of interference cancelation capabilities of the mobile device into several groups of interference cancelation capabilities, to deactivate one or more groups of the groups of interference cancelation capabilities, and to report a current interference cancelation capability to a base station, wherein the current interference cancelation capability comprises one or more active groups of the groups of interference cancelation capabilities remaining active after deactivation.

In an additional aspect of the disclosure, an apparatus includes at least one processor and a memory coupled to the processor. The processor is configured to receive, at a base station, a current interference cancelation capability report from a mobile device served by the base station, to determine communication conditions of the mobile device in relation to the base station, and to modify the communication conditions based, at least in part, on the current interference cancelation capability report.

BRIEF DESCRIPTION OF THE DRAWINGS

FIG. 5 is a block diagram illustrating a cell in a wireless network configured according to one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
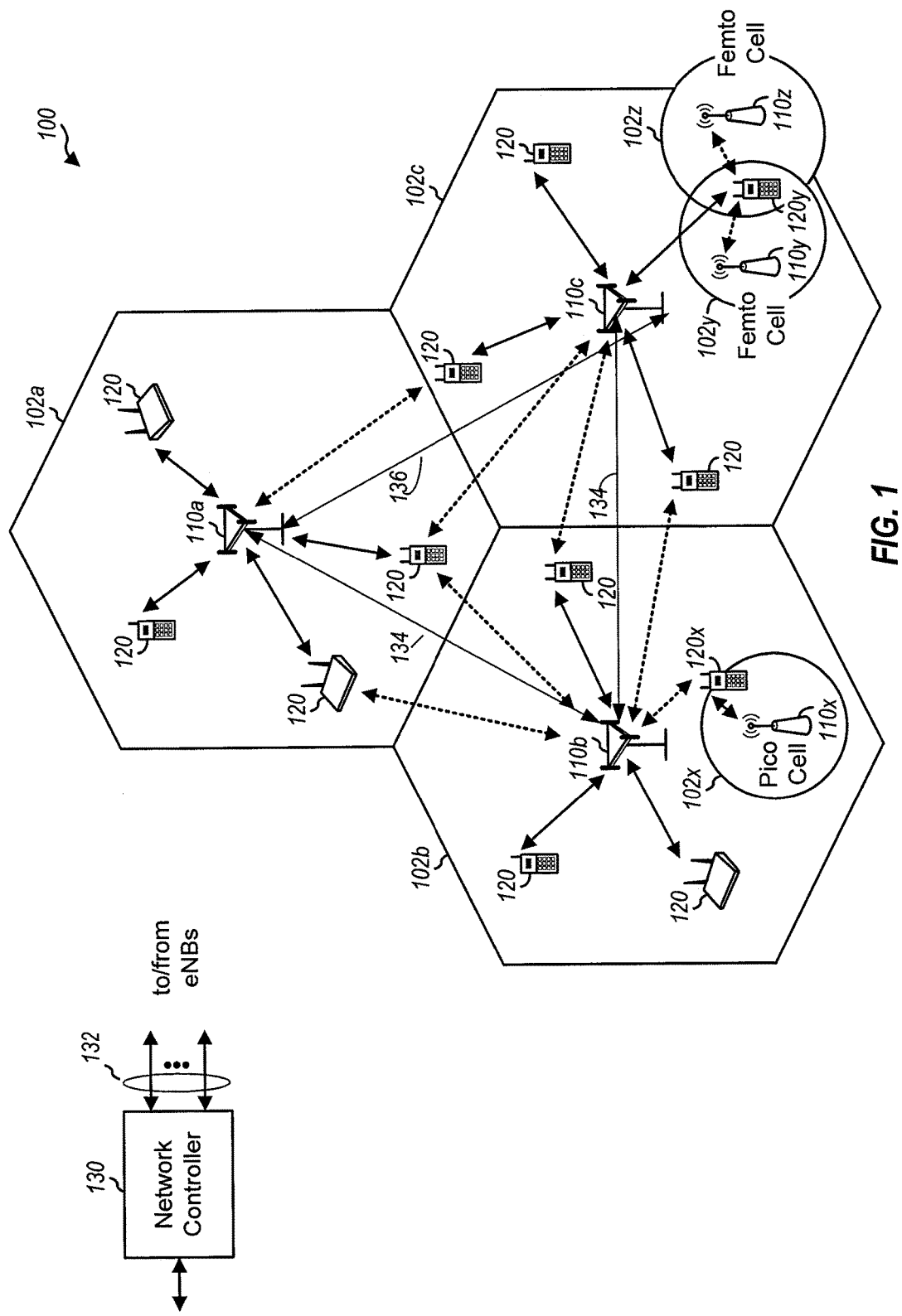
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
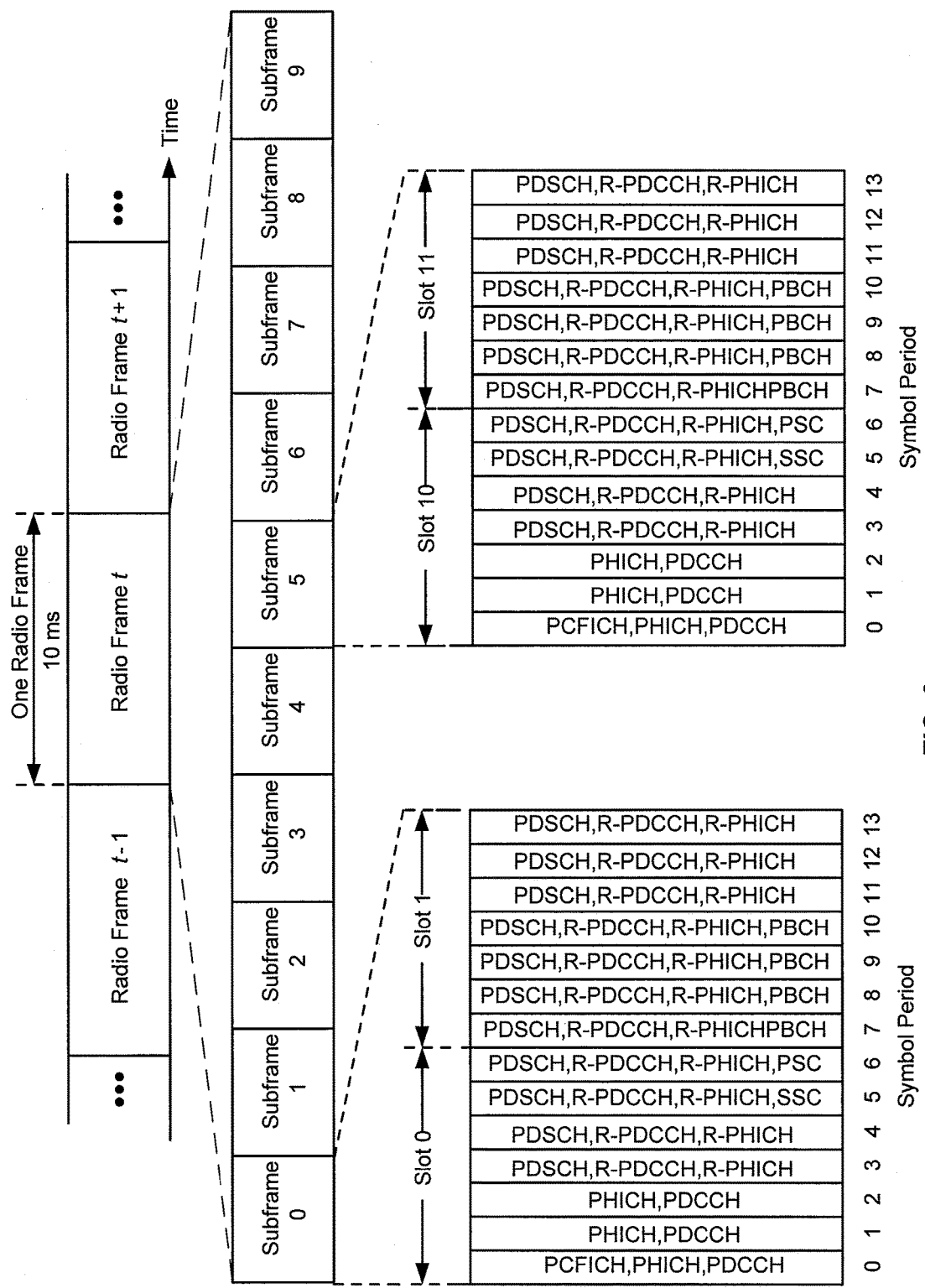
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In order to address new features, an enhanced PDCCH (ePDCCH) is being suggested as an advanced control channel. Unlike the conventional PDCCH control channel, ePDCCH is designed to use part of the resource blocks and occupy the remaining symbols of the downlink shared channel (data channel) in one subframe. The ePDCCH will allow the control signaling to benefit from the same gain mechanisms as the data: frequency domain scheduling and beamforming.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110*a-c* are usually carefully planned and placed by the provider of the wireless network 100. The macro eNBs 110*a-c* generally transmit at high power levels (e.g., 5 W-40 W). The pico eNB 110*x*, which generally transmits at substantially lower power levels (e.g., 100 mW-2 W), may be deployed in a relatively unplanned manner to eliminate coverage holes in the coverage area provided by the macro eNBs 110*a-c* and improve capacity in the hot spots. The femto eNBs 110*y-z*, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110*x*, is characterized by a substantially lower transmit power when compared with a macro eNB, such as the macro eNBs 110*a-c*. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 3:
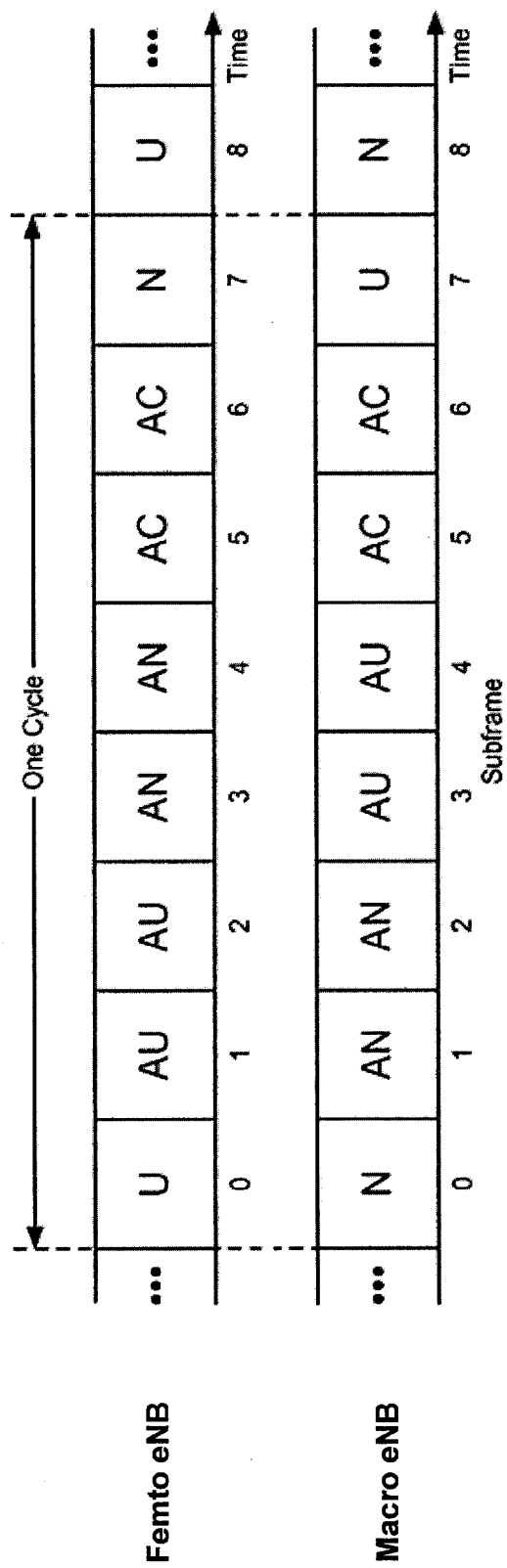
FIG. 3 is a block diagram conceptually illustrating time division multiplexed (TDM) partitioning in a heterogeneous network according to one aspect of the disclosure.

FIG. 3 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
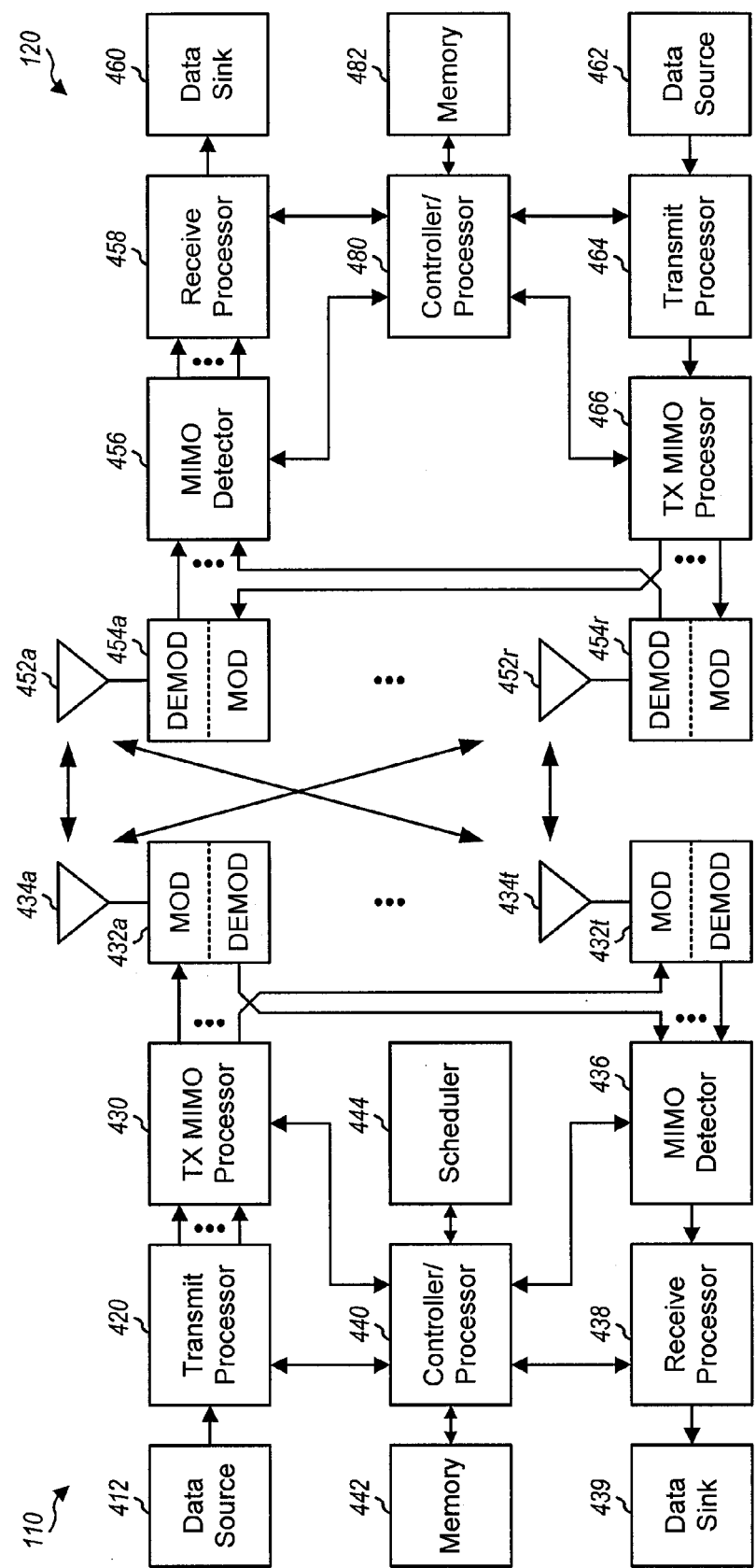
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 7 and 8, and/or other processes for the techniques described herein. The memories 442 and 482 may store data and program codes for the eNB 110 and the UE 120, respectively. A scheduler 444 may schedule UEs for data transmission on the downlink and/or uplink.

As previously noted, UEs may perform a broad variety of interference cancelation (IC) in normal operation. UEs may cancel synchronization signals, such as PSS and SSS, broadcast channel interference from PBCH, common signals, such as common reference signals (CRS), control channel interference, such as from PCFICH, PHICH, PDCCH, data channel interference, such as from PDSCH, and the like. In interference cancelation of certain high bandwidth interference, such as data interference cancellation from PDSCH, the UE may have bandwidth-dependent IC capabilities. For example, in IC of PDSCH interference, the UE may be limited to IC over a certain number of resource blocks (RBs) because of the complexity constraint of IC over a larger bandwidth of signals.

While UEs may maintain the capabilities to do most of these types of IC processing, a UE may disable some of this IC capability based on radio conditions or available power. Moreover, if a serving eNB is aware of the UE IC capabilities, it may use this information to assist the UE in managing power consumption or to account for and/or manage the UE's IC capabilities to better schedule downlink or uplink transmission schedules.

In one aspect of the present disclosure, a UE may deactivate different IC capabilities based on the operating conditions that it is experiencing. Operating conditions may be conditions such as the radio conditions viewed by the UE, the battery power level of the UE, the power consumption rate, or the like. For example, if the battery power is very low, the UE may determine to deactivate all but a few IC capabilities or even simply deactivate all of its IC capabilities. In another example, if the radio conditions are very good without much interference, the UE may determine to deactivate data IC, control channel IC, but maintain synchronization signal IC and CRS IC.

Alternatively, the UE may select which of its IC capabilities to maintain and/or deactivate based on the detected operating conditions, the UE may adjust how it reports its currently selected IC capability to the base station.

In order to further manage UE IC capabilities, a UE may divide its IC capabilities into different groups. These groups may be simple or random groups or may also be logical groups. For example, a first capability group may include common channel IC, such as IC of PSS, SSS, PBCH, CRS, and the like (Group 1). A second capability group may include control channel IC, such as IC of PCFICH, PHICH, and PDCCH, and the like (Group 2). A third capability group may include data channel IC, such as IC of PDSCH interference (Group 3). With the UEs' IC capabilities divided into defined groups, the UE may signal its IC capabilities to eNBs based on its defined groups, such that a given UE may signal the eNB that it uses capability Groups 1, 2, and 3, or some combination of capability Groups 1, 2, and 3. Alternatively, the UE may define its capabilities based on IC classes, whereby Class 1 includes the capabilities associated with Group 1, Class 2 includes the capabilities associated with Group 1 and Group 2, etc. The number of groups and classes and their respective granularity of capabilities may also vary based on implementation.

FIG. 5 is a block diagram illustrating a cell 500 in a wireless network configured according to one aspect of the present disclosure. Cell 500 is serviced by a macro eNB 501 and includes a pico cell deployment of a pico eNB 502 with a pico service area 503. In the illustrated time period, two UEs are served within cell 500, UEs 504, 505, and 506. UE 504 is being served by pico eNB 502 within the cell range expansion (CRE) area between the pico service area boundary 503 and the cell range boundary 507. UE 505 is far enough away from pico eNB 502 that it does not experience interference from the pico cell deployment. In one example aspect, UE 504 determines that its battery level is low and that, with all of its capabilities active, the power consumption rate is high. Also, UE 504 recognizes that it is being served by pico eNB 502 on shared subframes with a strong interfering CRS from macro eNB 501. Based on these determined operating conditions, UE 504 determines to maintain common channel IC and data channel IC, but to deactivate its remaining IC capabilities (e.g., deactivating control channel IC, and the like). UE 504 transmits a report message to macro eNB 501 indicating that its current IC capabilities include Groups 1 and 3.

Similarly, UE 505 determines that its radio conditions are good without much interference and that it has full battery charge and low power consumption rate. UE 505 transmits its current capabilities report to macro eNB 501 indicating that its current IC capabilities include Groups 1, 2, and 3.

An eNB may use the current capabilities information to manage communication with the UE. For example, an eNB may transmit signals to the UE turning on or off some of the UE's IC capability. The eNB would receive the reported IC capability from the UE and, using the known capabilities, detect the current communications conditions with the UE and determine whether turning off some of the UEs' IC capabilities would be beneficial. With regard to the example illustrated in FIG. 5, when macro eNB 501 receives the current IC capabilities report from UE 505, it detects that there is little interference where UE 505 is located and, based on this communication condition, determines that UE 505 may conserve power by turning off all of its IC capabilities. Accordingly, macro eNB 501 modifies the communication condition by transmitting a signal to UE 505 directing UE 505 to deactivate all of its IC capabilities for Groups 1, 2, and 3.

In another aspect, the eNB may use the UE's reported current IC capability to determine a scheduling algorithm for the UE with IC capability. For example, if a particular UE has limited or no data IC capabilities, the eNB may schedule downlink transmissions to that UE during protected subframes. Thus, the UE would not be required to perform data IC as if downlink data were transmitted in shared subframes while another data transmission is occurring in the shared subframe. Similarly, if a particular UE has strong data IC capabilities, the eNB may determine to schedule downlink transmissions to that UE in shared subframes, as the UE would be more capable of communication in the presence of interfering data transmissions.

Referring again to FIG. 5, when macro eNB 501 receive the current IC capability report from UE 504, it determines that UE 504 has limited current IC capabilities and is operating in the pico cell served by pico eNB 502. Based on these communication conditions, macro eNB 501 determines that it should only schedule communications with UE 504 during protected subframes. Macro eNB 501 modifies the communication conditions based on the current IC capabilities by scheduling UE 504 communications only on protected subframes. Macro eNB 501 then signals UE 504 to deactivate its Group 3 IC capabilities to conserve power. Since its communications have now been scheduled for protected subframes, there is less of a need for UE 504 to use the data channel IC capabilities of Group 3.

In another example of how an eNB may utilize knowledge of the UEs IC capability, the eNB may use a larger range for the CQI control loop. If a UE reports a particular robust IC capability, the eNB may use the larger range of CQI control loop, as the backoff loop would not necessarily require smaller adjustments with a UE having strong IC capabilities. Similarly, if the UE reports limited IC capability, the eNB may use a smaller backoff loop for the CQI control loop for that UE. Again, by using the knowledge of the UE's IC capabilities, the eNB may take actions or schedule communication to more efficiently make use of the available resources.

Referring again to FIG. 5, UE 506 transmits its current IC capabilities report to macro eNB 501 indicating that Groups 1, 2, and 3 are all active. Macro eNB 501 determines the current communication conditions regarding UE 506. UE 506 experiences some surrounding interference, however, with all of its IC capability groups active, macro eNB 501 determines that UE 506 should maintain its current IC capability. Moreover, with all IC groups active, UE 506 has good IC capability for any interfering signal types. Based on those current capabilities of UE 506, macro eNB 501 determines that it may increase the backoff loop with respect to the CQI control for UE 506. Therefore, the step size for the CQI control loop become larger, as UE 506 is more capable of handling stronger interference or a weaker channel quality.

Figure 6:
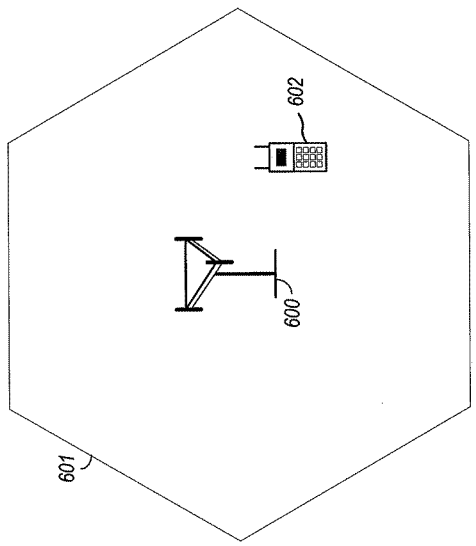
FIG. 6 is a block diagram illustrating a cell in a wireless network configured according to one aspect of the present disclosure.

Under certain communication conditions, the serving eNB may determine simply to deactivate all IC capabilities of a served UE. FIG. 6 is a block diagram illustrating a cell 601 in a wireless network configured according to one aspect of the present disclosure. UE 602 sends its current IC capability report to eNB 600. eNB 600 determines the current communication conditions as very favorable. Because there is no pico cell deployment within cell 601, eNB 600 determines that UE 602 may deactivate all of its current IC capabilities and transmits a signal to UE 602 directing such action.

Figure 7:
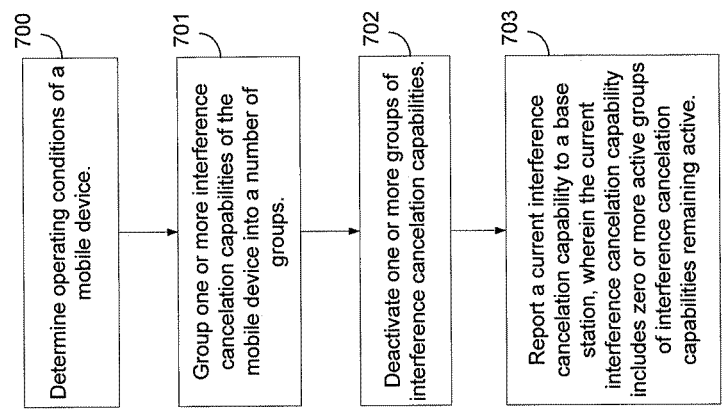
FIG. 7 is a functional block diagram illustrating example blocks executed to implement one aspect of the present disclosure.
Figure 9:
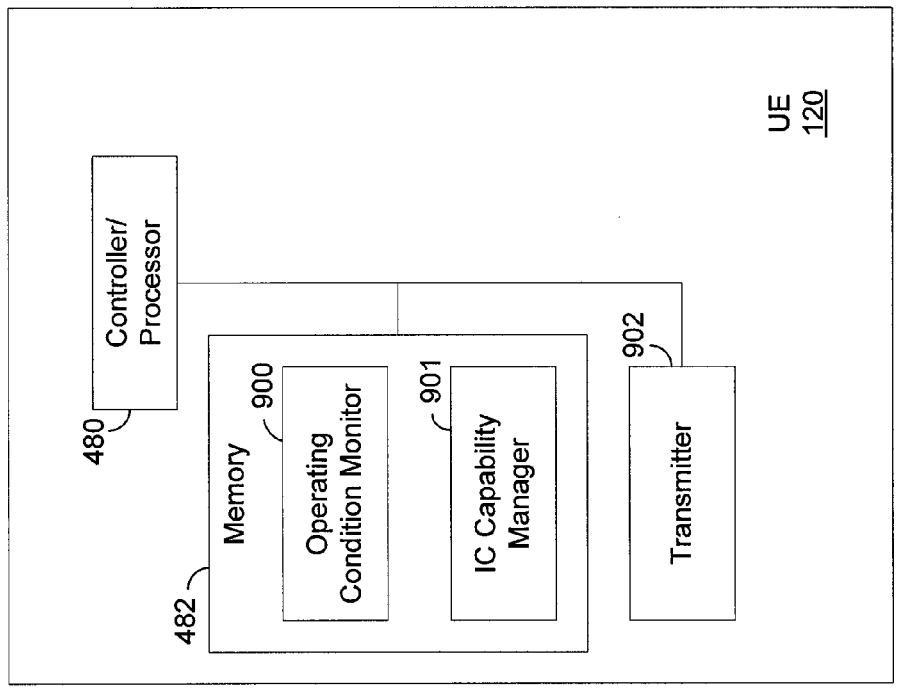
FIG. 9 is a block diagram illustrating a UE configured according to one aspect of the present disclosure.

FIG. 7 is a functional block diagram illustrating example blocks executed to implement one aspect of the present disclosure. In block 700, a mobile device determines its current operating conditions. The operating conditions of the mobile device may include conditions, such as radio conditions, interference level, signal-to-noise ratios, battery power level, power consumption rate, and the like. In beginning the IC management process, the mobile device determines and evaluates these operating conditions. A mobile device, such as UE 120, as depicted in FIG. 9, will typically have internal diagnostic applications, such as operating condition monitor 900, that will be executed to obtain various operating conditions.

In block 701, the mobile device groups its various interference cancelation capabilities into different groups. The groups may be organized by particular functionality or effect of the interference being canceled. For example, interference cancelation capabilities may be grouped as capabilities involving the common channel interference, the control channel interference, and the data channel interference. In such aspects, the mobile device, such as UE 120, operates interference cancelation capability management applications, such as IC capability manager 901, to identify or associate the particular capabilities with different groups.

In block 702, the mobile device selects to deactivate one or more of the groups of interference capabilities. The mobile device, such as UE 120, in operating or executing IC capability manager 901, will examine its current operating conditions and determine whether some of the groups should be deactivated. Based on this operating condition analysis, the mobile device selects which of the groups to deactivate.

In block 703, the mobile device reports its current interference cancelation capability to the base station. After determining which groups of interference cancelation capabilities to deactivate based on the operating conditions, the mobile device send a reporting message to the base station to inform the base station of its current set of active interference cancelation capabilities groups. The mobile device, such as UE 120, through operation of the IC capability manager 901, will transmit the report using transmitter 902 to its serving base station once the particular groups of interference cancelation capabilities have been deactivated. The mobile device, in such aspects, will transmit the reporting message based on which ever groups remain active.

Figure 8:
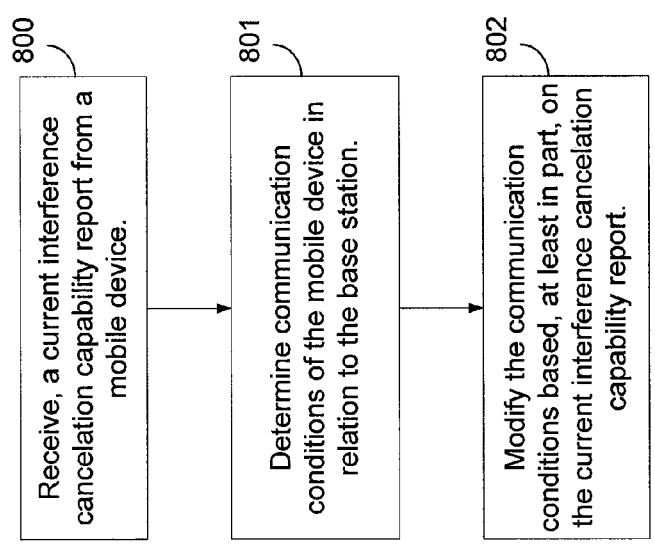
FIG. 8 is a functional block diagram illustrating example blocks executed to implement one aspect of the present disclosure.
Figure 10:
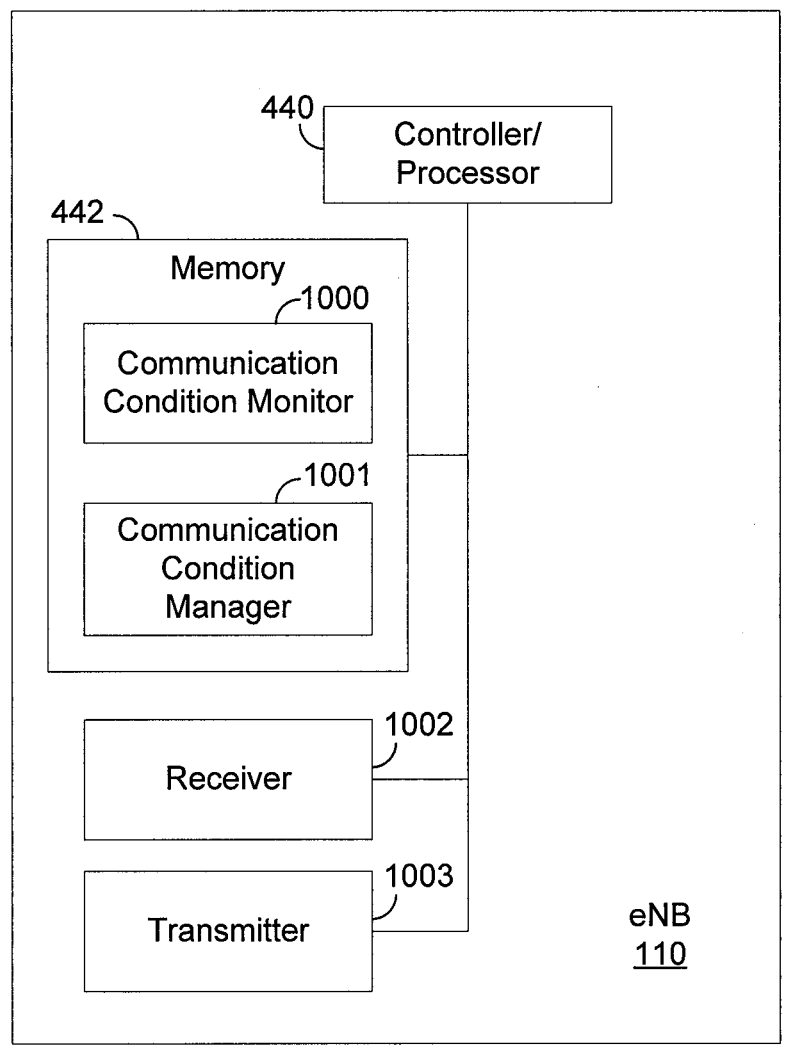
FIG. 10 is a block diagram illustrating an eNB configured according to one aspect of the present disclosure.

FIG. 8 is a functional block diagram illustrating example blocks executed to implement one aspect of the present disclosure. In block 800, a base station receives a current IC capability report message from one of its served mobile devices. This current IC capability report may include a list of individual IC capabilities that are currently active for the mobile device or may include a list of active groups of IC capabilities. For example, a base station, such as eNB 110, as depicted in FIG. 10, includes receiver 1002 that receives incoming signals from network entities, including mobile stations, which may include IC capability report messages. The base stations, such as eNB 110 would include applications for monitoring the conditions of serviced mobile stations, such as communication condition monitor 1000.

In block 801, the base station determines the current communication conditions of the mobile device with respect to the base station. The communication conditions may include the current communication scheduling for the mobile device, the existing interference, whether there is a pico cell deployment within the base station coverage area, whether there are multiple mobile devices being served in the same area, and the like. Te base station, such as eNB 110, uses the condition information detected by the executing communication condition monitor 1000 in executing analysis applications, such as communication condition manager 1001 to determine whether some modification to those conditions may be beneficial to the UE.

In block 802, the base station modifies the communication conditions based, at least in part, on the current IC capability report. As the base station, such as eNB 110, knows the current IC capabilities of the mobile device, as monitored by communication condition monitor 1000, it may determine, through execution of communication condition manager 1001, whether it may be beneficial to modify the communication conditions by, for example, signaling the mobile device to deactivate additional IC capabilities, changing the communication scheduling of the mobile device, modifying the control loop for the CQI process associated with the mobile device, and the like. Thus, by using the mobile device's current IC capabilities and the current communication conditions with respect to the mobile device, the base station may take actions to improve the communications or performance of the mobile device. A base station, such as eNB 110, may transmit such modification to the particular mobile station using transmitter 1003.

FIG. 9 is a block diagram illustrating a UE 120 configured according to one aspect of the present disclosure. UE 120 includes a controller/processor 480. Controller/processor 480 executes the program code stored in memory 482 at the UE 120 either as software or firmware, and generally controls the operation and functionality of UE 120. UE 120 also includes an operating condition monitor 900 stored in memory 482 that, when executed by controller/processor 480, monitors and detects current operating conditions, such as the radio conditions, battery level, power consumption, communication scheduling, and the like. Controller/processor 480 and operating condition monitor 900 combine to provide means for determining operating conditions of a mobile device.

UE 120 also includes an IC capability manager 901 stored in memory 482. When executed by controller/processor 480, IC capability manager 901 groups one or more of the interference cancelation capabilities of UE 120 into various groups. The combination of controller/processor 480, memory 482, and the executing IC capability manager 901 combine to provide means for grouping one or more IC capabilities of the mobile device into a plurality of groups.

The executing IC capability manager 901, under control of controller/processor 480 uses the detected operating conditions to select which of UE 120's groups of IC capabilities may be deactivated to improve such conditions. Controller/processor 480 and IC capability manager 901 combine to provide means for deactivating selected groups of IC capabilities from all of the groups of IC capabilities available to UE 120.

UE 120 also includes transmitter 902. Transmitter 902, under control of controller/processor 480, transmits a report of UE 120's currently active groups of IC capabilities to the base station. Transmitter 902 may be implemented with various hardware and components, such as transmit processor 464, TX MIMO processor 466, modulators 454a-r, and antennas 452a-r. Controller/processor 480 and transmitter 902 combine to provide means for reporting a current IC capability to a base station where the current IC capability includes the individual IC capabilities remaining active at UE 120.

FIG. 10 is a block diagram illustrating an eNB 110 configured according to one aspect of the present disclosure. eNB 110 includes a controller/processor 440. Controller/processor 440 executes the program code stored at the eNB 110 either as software or firmware, and generally controls the operation and functionality of eNB 110. eNB 110 includes a receiver 1002. Receiver 1002, under control of controller/processor 440, operates to receive the current IC capability reports from mobile devices served by eNB 110. Receiver 1002 may be implemented with various hardware and components, such as receive processor 438, MIMO detector 436, demodulators 432a-t, and antennas 434a-t. Controller/processor 440 and receiver 1002 combine to provide means for receiving a current IC capability report from a mobile device served by eNB 110.

eNB 110 also includes a communication condition monitor 1000. When executed by controller/processor 440, communication condition monitor 1000 operates to monitor and detect the current communication conditions with respect to mobile devices. Communication condition monitor 1000 monitors and detects conditions, such as the current communication scheduling for the mobile device, the existing interference, whether there is a pico cell deployment within the base station coverage area, whether there are multiple mobile devices being served in the same area, and the like.

eNB 110 also includes a communication condition manager 1001. When executed by controller/processor 440, communication condition manager 1000 uses the detected communication conditions along with the current IC capability report to determine when eNB 110 should modify any of the communication conditions with respect to the reporting mobile device. For example, the operating communication condition manager 1000 may cause changes to the communication conditions by signaling the mobile device to deactivate additional IC capabilities, changing the communication scheduling of the mobile device, modifying the control loop for the CQI process associated with the mobile device, and the like. Some of such modifications may also be communicated to the particular mobile device via transmitter 1003, under control of controller/processor 440. Controller/processor 440 and communications condition manager 1001 combine to provide means for modifying the communication conditions based, at least in part, on the current IC capability report.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a mobile device, operating conditions of the mobile device;
   grouping a plurality of interference cancelation capabilities of the mobile device into a plurality of groups of interference cancelation capabilities, wherein each interference cancelation capability of the plurality of interference cancelation capabilities is included in at least one group of the plurality of groups, and wherein the grouping is based on a characteristic of each interference cancelation capability of the plurality of interference cancelation capabilities, such that each group of the plurality of groups represents a different characteristic of the interference cancelation capabilities;
   deactivating, by the mobile device, one or more groups from the plurality of groups of interference cancelation capabilities; and
   reporting, by the mobile device, a current interference cancelation capability to a base station, wherein the current interference cancelation capability comprises a set of active groups from the plurality of groups of interference cancelation capabilities remaining active after the deactivating.

2. The method of claim 1, wherein the operating conditions comprise one or more of:
   radio conditions surrounding the mobile device;
   battery power level of the mobile device; and
   power consumption rate of the mobile device.

3. The method of claim 1, further comprising:
   receiving a signal from the base station; and
   wherein the deactivating includes deactivating the one or more groups from the plurality of groups of interference cancelation capabilities, in response to the signal.

4. The method of claim 1, wherein the characteristic of the interference cancelation capabilities relates to interference cancelation for one or more of:
   a common channel interference;
   a control channel interference; and
   a data channel interference.

5. The method of claim 4, wherein:
   the interference cancelation for the common channel interference includes interference cancelation for one or more of: primary synchronization signals (PSS), secondary synchronization signals (SSS), physical broadcast channel (PBCH), and common reference signals (CRS);
   the interference cancelation for the control channel interference includes interference cancelation for one or more of: physical control format indicator channel (PCFICH), physical hybrid automatic repeat request (HARQ) indicator channel (PHICH), physical downlink control channel (PDCCH), and enhanced PDCCH (ePDCCH); and
   the interference cancelation for the data channel interference includes interference cancelation for physical downlink shared channel (PDSCH).

6. A method of wireless communication, comprising:
   receiving, at a base station, a current interference cancelation capability report from a mobile device served by the base station;
   determining communication conditions of the mobile device in relation to the base station; and
   modifying the communication conditions based, at least in part, on the current interference cancelation capability report, including signaling the mobile device to deactivate one or more active groups of interference cancelation capabilities from a set of active groups of interference cancelation capabilities, wherein the one or more active groups of interference cancelation capabilities signaled for deactivation are determined based, at least in part, on the current interference cancelation capability report, and wherein the groups in the set of active groups are part of a plurality of groups of interference cancelation capabilities, wherein each interference cancelation capability of a plurality of interference cancelation capabilities of the mobile device is included in at least one group of the plurality of groups, and wherein the plurality of groups is grouped based on a characteristic of each interference cancelation capability of the plurality of interference cancelation capabilities of the mobile device, such that each group of the plurality of groups represents a different characteristic of the interference cancelation capabilities.

7. The method of claim 6, wherein the current interference cancelation capability report includes the set of active groups of interference cancelation capabilities, and wherein the plurality of groups of interference cancelation capabilities is grouped by the mobile device.

8. The method of claim 7, wherein modifying the communication conditions comprises:
   scheduling the mobile device for transmission in one or more subframes determined, at least in part, on the current interference cancelation capability report.

9. The method of claim 7, wherein modifying the communication conditions comprises:
   adjusting a backoff loop of a channel quality indicator (CQI) process associated with the mobile device, the adjusting based, at least in part, on the current interference cancelation capability report.

10. An apparatus configured for wireless communication, comprising:
- means for determining, by a mobile device, operating conditions of the mobile device;
- means for grouping a plurality of interference cancelation capabilities of the mobile device into a plurality of groups of interference cancelation capabilities, wherein each interference cancelation capability of the plurality of interference cancelation capabilities is included in at least one group of the plurality of groups, wherein the grouping is based on a characteristic of each interference cancelation capability of the plurality of interference cancelation capabilities, such that each group of the plurality of groups represents a different characteristic of the interference cancelation capabilities;
- means for deactivating, by the mobile device, one or more groups from the plurality of groups of interference cancelation capabilities; and
- means for reporting, by the mobile device, a current interference cancelation capability to a base station, wherein the current interference cancelation capability c comprises a set of active groups from the plurality of groups of interference cancelation capabilities remaining active after execution of the means for deactivating.

11. The apparatus of claim 10, wherein the operating conditions comprise one or more of:
- radio conditions surrounding the mobile device;
- battery power level of the mobile device; and
- power consumption rate of the mobile device.

12. The apparatus of claim 10, further comprising:
- means for receiving a signal from the base station; and
- wherein the means for deactivating includes means for deactivating the one or more groups from the plurality of groups of interference cancelation capabilities, in response to the signal.

13. The apparatus of claim 10, wherein the characteristic of the interference cancelation capabilities relates to interference cancelation for one or more of:
- a common channel interference;
- a control channel interference; and
- a data channel interference.

14. The apparatus of claim 13, wherein:
- the interference cancelation for the common channel interference includes interference cancelation for one or more of: primary synchronization signals (PSS), secondary synchronization signals (SSS), physical broadcast channel (PBCH), and common reference signals (CRS);
- the interference cancelation for the control channel interference includes interference cancelation for one or more of: physical control format indicator channel (PCFICH), physical hybrid automatic repeat request (HARQ) indicator channel (PHICH), physical downlink control channel (PDCCH), and enhanced PDCCH (ePDCCH); and
- the interference cancelation for the data channel interference includes interference cancelation for physical downlink shared channel (PDSCH).

15. An apparatus of wireless communication, comprising:
- means for receiving, at a base station, a current interference cancelation capability report from a mobile device served by the base station;
- means for determining communication conditions of the mobile device in relation to the base station; and
- means for modifying the communication conditions based, at least in part, on the current interference cancelation capability report, including means for signaling the mobile device to deactivate one or more active groups of interference cancelation capabilities from a set of active groups of interference cancelation capabilities, wherein the one or more active groups of interference cancelation capabilities signaled for deactivation are determined based, at least in part, on the current interference cancelation capability report, and wherein the groups in the set of active groups are part of a plurality of groups of interference cancelation capabilities, wherein each interference cancelation capability of a plurality of interference cancelation capabilities of the mobile device is included in at least one group of the plurality of groups, and wherein the plurality of groups is grouped based on a characteristic of each interference cancelation capability of the plurality of interference cancelation capabilities of the mobile device, such that each group of the plurality of groups represents a different characteristic of the interference cancelation capabilities.

16. The apparatus of claim 15, wherein the current interference cancelation capability report includes the set of active groups of interference cancelation capabilities, and wherein the plurality of groups of interference cancelation capabilities is grouped by the mobile device.

17. The apparatus of claim 16, wherein means for modifying the communication conditions comprises:
- means for scheduling the mobile device for transmission in one or more subframes determined, at least in part, on the current interference cancelation capability report.

18. The apparatus of claim 16, wherein means for modifying the communication conditions comprises:
- means for adjusting a backoff loop of a channel quality indicator (CQI) process associated with the mobile device, the adjusting based, at least in part, on the current interference cancelation capability report.

19. A computer program product for wireless communications in a wireless network, comprising:
- a non-transitory computer-readable medium having program code recorded thereon, the program code comprising:
  - program code to determine, by a mobile device, operating conditions of the mobile device;
  - program code to group a plurality of interference cancelation capabilities of the mobile device into a plurality of groups of interference cancelation capabilities, wherein each interference cancelation capability of the plurality of interference cancelation capabilities is included in at least one group of the plurality of groups, and wherein the plurality of interference cancelation capabilities is grouped based on a characteristic of each interference cancelation capability of the plurality of interference cancelation capabilities, such that each group of the plurality of groups represents a different characteristic of the interference cancelation capabilities;
  - program code to deactivate, by the mobile device, one or more groups from the plurality of groups of interference cancelation capabilities; and
  - program code to report, by the mobile device, a current interference cancelation capability to a base station, wherein the current interference cancelation capability comprises a set of active groups from the plurality of groups of interference cancelation capabilities remaining active after execution of the program code to deactivate.

20. The computer program product of claim 19, wherein the operating conditions comprise one or more of:
   radio conditions surrounding the mobile device;
   battery power level of the mobile device; and
   power consumption rate of the mobile device.

21. The computer program product of claim 19, further comprising:
   program code to receive a signal from the base station; and
   wherein the program code to deactivate includes program code to deactivate the one or more groups from the plurality of groups of interference cancelation capabilities, in response to the signal.

22. The computer program product of claim 19, wherein the characteristic of the interference cancelation capabilities relates to interference cancelation for one or more of:
   a common channel interference;
   a control channel interference; and
   a data channel interference.

23. The computer program product of claim 22, wherein:
   the interference cancelation for the common channel interference includes interference cancelation for one or more of: primary synchronization signals (PSS), secondary synchronization signals (SSS), physical broadcast channel (PBCH), and common reference signals (CRS);
   the interference cancelation for the control channel interference includes interference cancelation for one or more of: physical control format indicator channel (PCFICH), physical hybrid automatic repeat request (HARQ) indicator channel (PHICH), physical downlink control channel (PDCCH), and enhanced PDCCH (ePDCCH); and
   the interference cancelation for the data channel interference includes interference cancelation for physical downlink shared channel (PDSCH).

24. A computer program product for wireless communications in a wireless network, comprising:
   a non-transitory computer-readable medium having program code recorded thereon, the program code comprising:
      program code to receive, at a base station, a current interference cancelation capability report from a mobile device served by the base station;
      program code to determine communication conditions of the mobile device in relation to the base station; and
      program code to modify the communication conditions based, at least in part, on the current interference cancelation capability report, including program code to signal the mobile device to deactivate one or more active groups of interference cancelation capabilities from a set of active groups of interference cancelation capabilities, wherein the one or more active groups of interference cancelation capabilities signaled for deactivation are determined based, at least in part, on the current interference cancelation capability report, and wherein the groups in the set of active groups are part of a plurality of groups of interference cancelation capabilities, wherein each interference cancelation capability of a plurality of interference cancelation capabilities of the mobile device is included in at least one group of the plurality of groups, and wherein the plurality of groups is grouped based on a characteristic of each interference cancelation capability of the plurality of interference cancelation capabilities of the mobile device, such that each group of the plurality of groups represents a different characteristic of the interference cancelation capabilities.

25. The computer program product of claim 24, wherein the current interference cancelation capability report includes the set of active groups of interference cancelation capabilities, and wherein the plurality of groups of interference cancelation capabilities is grouped by the mobile device.

26. The computer program product of claim 25, wherein program code to modify the communication conditions comprises:
   program code to schedule the mobile device for transmission in one or more subframes determined, at least in part, on the current interference cancelation capability report.

27. The computer program product of claim 25, wherein program code to modify the communication conditions comprises:
   program code to adjust a backoff loop of a channel quality indicator (CQI) process associated with the mobile device, the adjusting based, at least in part, on the current interference cancelation capability report.

28. An apparatus configured for wireless communication, the apparatus comprising
   at least one processor; and
   a memory coupled to the at least one processor,
   wherein the at least one processor is configured:
      to determine, by a mobile device, operating conditions of the mobile device;
      to group a plurality of interference cancelation capabilities of the mobile device into a plurality of groups of interference cancelation capabilities, wherein each interference cancelation capability of the plurality of interference cancelation capabilities is included in at least one group of the plurality of groups, wherein the plurality of interference cancelation capabilities is grouped based on a characteristic of each interference cancelation capability of the plurality of interference cancelation capabilities, such that each group of the plurality of groups represents a different characteristic of the interference cancelation capabilities;
      to deactivate, by a mobile device, one or more groups from the plurality of groups of interference cancelation capabilities; and
      to report, by the mobile device, a current interference cancelation capability to a base station, wherein the current interference cancelation capability comprises a set of active groups from the plurality of groups of interference cancelation capabilities remaining active after deactivation.

29. The apparatus of claim 28, wherein the operating conditions comprise one or more of:
   radio conditions surrounding the mobile device;
   battery power level of the mobile device; and
   power consumption rate of the mobile device.

30. The apparatus of claim 28, wherein the at least one processor is further configured:
   to receive a signal from the base station; and
   wherein the configuration of the at least one processor to deactivate includes configuration to deactivate the one or more groups from the plurality of groups of interference cancelation capabilities, in response to the signal.

31. The apparatus of claim 28, wherein the characteristic of the interference cancelation capabilities relates to interference cancelation for one or more of:
- a common channel interference;
- a control channel interference; and
- a data channel interference.

32. The apparatus of claim 31, wherein:
- the interference cancelation for the common channel interference includes interference cancelation for one or more of: primary synchronization signals (PSS), secondary synchronization signals (SSS), physical broadcast channel (PBCH), and common reference signals (CRS);
- the interference cancelation for the control channel interference includes interference cancelation for one or more of: physical control format indicator channel (PCFICH), physical hybrid automatic repeat request (HARQ) indicator channel (PHICH), physical downlink control channel (PDCCH), and enhanced PDCCH (ePDCCH); and
- the interference cancelation for the data channel interference includes interference cancelation for physical downlink shared channel (PDSCH).

33. An apparatus configured for wireless communication, the apparatus comprising
- at least one processor; and
- a memory coupled to the at least one processor,
- wherein the at least one processor is configured:
  - to receive, at a base station, a current interference cancelation capability report from a mobile device served by the base station;
  - to determine communication conditions of the mobile device in relation to the base station; and
  - to modify the communication conditions based, at least in part, on the current interference cancelation capability report, including to signal the mobile device to deactivate one or more active groups of interference cancelation capabilities from a set of active groups of interference cancelation capabilities, wherein the one or more active groups of interference cancelation capabilities signaled for deactivation are determined based, at least in part, on the current interference cancelation capability report, and wherein the groups in the set of active groups are part of a plurality of groups of interference cancelation capabilities, wherein each interference cancelation capability of a plurality of interference cancelation capabilities of the mobile device is included in at least one group of the plurality of groups, and wherein the plurality of groups is grouped based on a characteristic of each interference cancelation capability of the plurality of interference cancelation capabilities of the mobile device, such that each group of the plurality of groups represents a different characteristic of the interference cancelation capabilities.

34. The apparatus of claim 33, wherein the current interference cancelation capability report includes the set of active groups of interference cancelation capabilities, and wherein the plurality of groups of interference cancelation capabilities is grouped by the mobile device.

35. The apparatus of claim 34, wherein configuration of the at least one processor to modify the communication conditions comprises configuration:
- to schedule the mobile device for transmission in one or more subframes determined, at least in part, on the current interference cancelation capability report.

36. The apparatus of claim 34, wherein configuration of the at least one processor to modify the communication conditions comprises configuration:
- to adjust a backoff loop of a channel quality indicator (CQI) process associated with the mobile device, the adjusting based, at least in part, on the current interference cancelation capability report.

* * * * *